(12) United States Patent
deBoer et al.

(10) Patent No.: US 6,665,175 B1
(45) Date of Patent: Dec. 16, 2003

(54) COMPUTER HAVING A MONITOR THAT HAS MULTIPLE DEGREES OF FREEDOM WITH RESPECT TO THE BASE OF THE COMPUTER

(76) Inventors: Carrie deBoer, #806-939 Homer Street, Vancouver, BC (CA), V6B-2W6; Craig deBoer, #806-939 Homer Street, Vancouver, BC (CA), V6B-2W6

( * ) Notice: Subject to any disclaimer, the term of this patent is extended or adjusted under 35 U.S.C. 154(b) by 95 days.

(21) Appl. No.: 10/061,999

(22) Filed: Feb. 4, 2002

(51) Int. Cl.[7] .................................................. G06F 1/16
(52) U.S. Cl. ...................... 361/681; 361/683; 312/223.2; 248/920; 248/923; 345/905; D14/378; D14/316
(58) Field of Search .............................. 361/681, 682, 361/683, 686, 779; 312/223.1, 223.2; 248/917–924; 345/905, 168, 169, 906, 1, 5, 102, 179; D14/316, 327, 375, 378

(56) References Cited

U.S. PATENT DOCUMENTS

| D296,851 S | 7/1988 | Kelley | |
|---|---|---|---|
| 4,925,240 A | 5/1990 | Peters | |
| 5,179,447 A | 1/1993 | Lain | |
| 5,375,076 A | 12/1994 | Goodrich et al. | |
| 5,379,183 A | 1/1995 | Okonsky et al. | |
| 5,390,075 A | 2/1995 | English et al. | |
| 5,729,429 A | * 3/1998 | Margaritis et al. | 361/680 |
| 5,991,150 A | * 11/1999 | Chiu et al. | 361/681 |
| 6,229,693 B1 | * 5/2001 | Karidis et al. | 361/681 |
| 6,233,138 B1 | * 5/2001 | Osgood | 361/681 |
| 6,262,885 B1 | * 7/2001 | Emma et al. | 361/683 |
| 6,295,038 B1 | * 9/2001 | Rebeske | 361/681 |
| 6,464,195 B1 | * 10/2002 | Hildebrandt | 361/681 |
| 6,504,707 B2 | * 1/2003 | Agata et al. | 361/681 |
| 2003/0103324 A1 | * 6/2003 | Gallivan | 361/681 |

* cited by examiner

Primary Examiner—Lisa Lea-Edmonds
(74) Attorney, Agent, or Firm—Donald R. Schoonover

(57) ABSTRACT

A computer monitor is movably attached to stanchions that are pivotally attached to a base of the computer. The monitor can be moved toward and away from the base and can be angularly adjusted with respect to the base of the computer whereby the monitor has a plurality of degrees of freedom and adjustment with respect to the base of the computer.

3 Claims, 6 Drawing Sheets

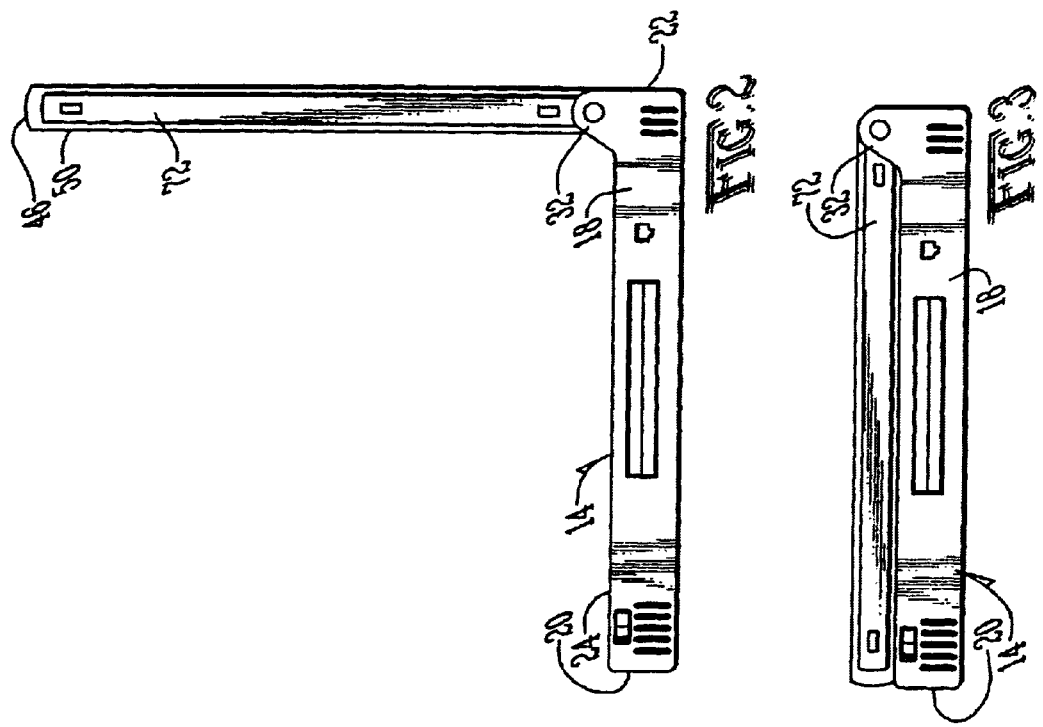
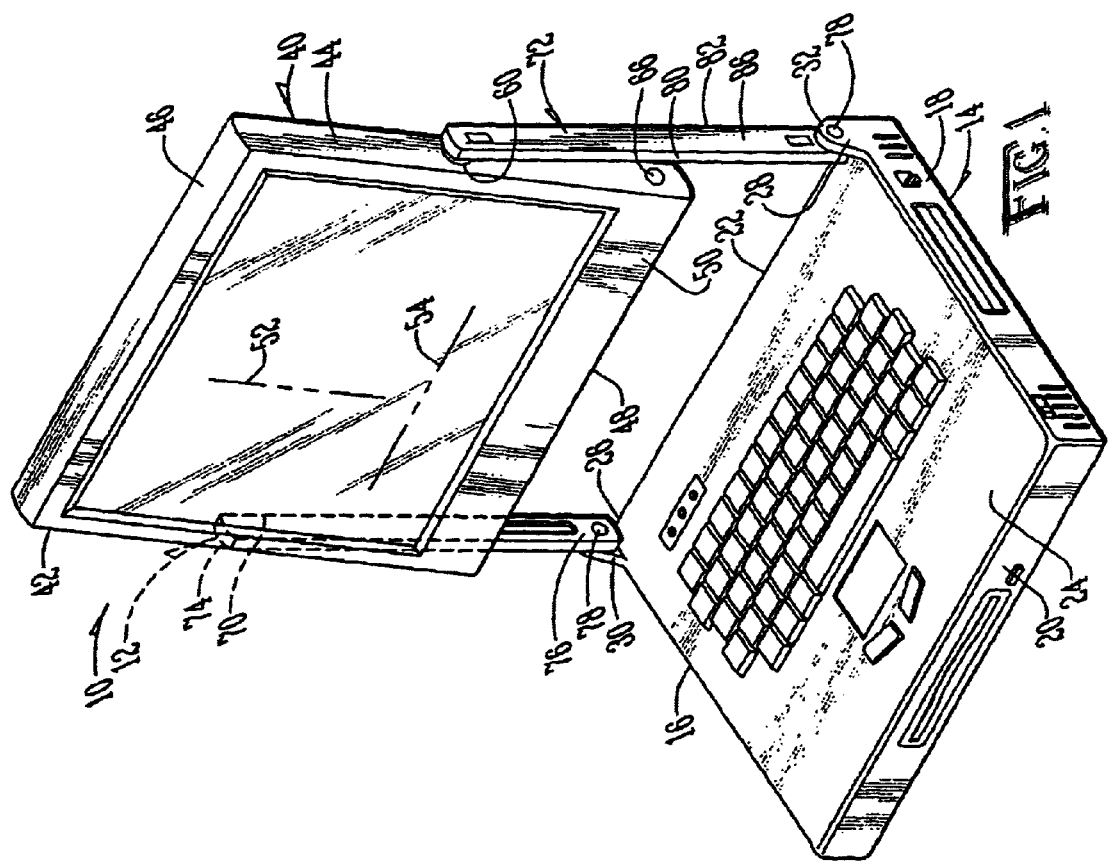

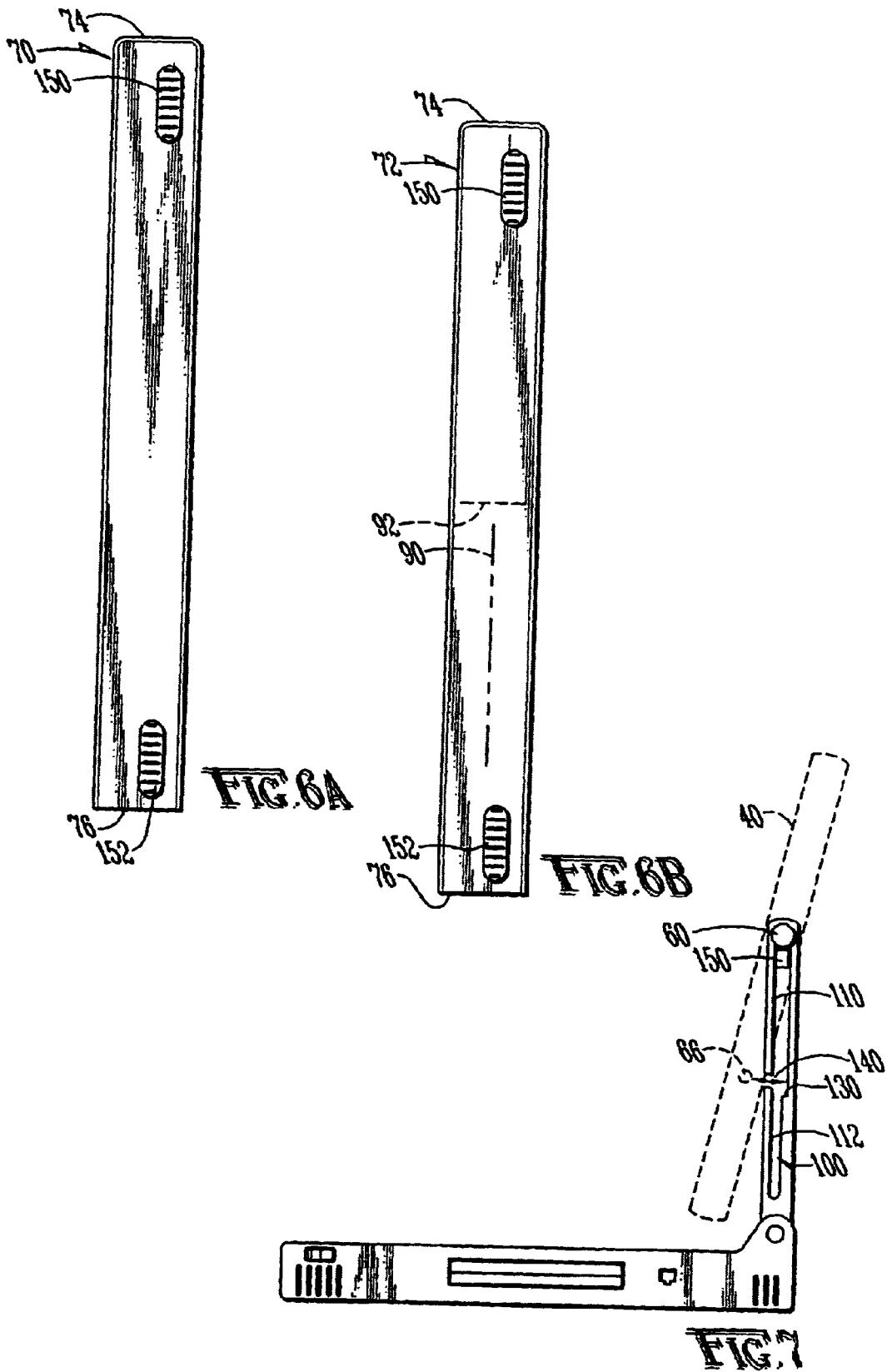

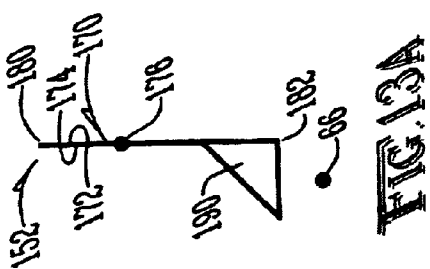
FIG.13A
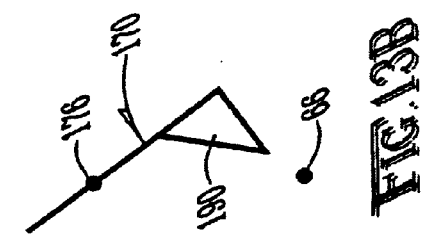
FIG.13B
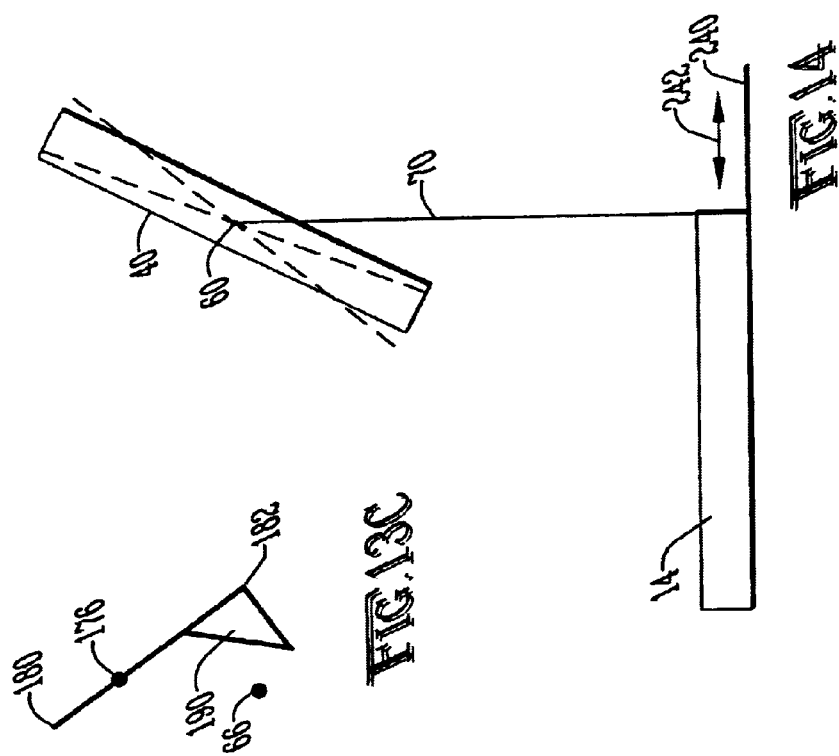
FIG.13C
FIG.14

COMPUTER HAVING A MONITOR THAT HAS MULTIPLE DEGREES OF FREEDOM WITH RESPECT TO THE BASE OF THE COMPUTER

BACKGROUND OF THE INVENTION

1. Field of the Invention

The present invention relates to the general art of computers and accessories therefor, and to the particular field of monitors for computers.

2. Discussion of the Related Art

Computers are overwhelming popular in today's society. Many of these computers are laptop-type, or notebook, computers that are designed to be extremely mobile. This mobility allows a user to use the computer nearly anywhere. The laptop computer can be supported on any surface, including the user's lap, and will function well in that environment.

As conventionally constructed, a laptop computer typically includes a base which stores the various electronic components of the computer, including the keyboard, the CPU, electronic control elements, and a lid portion that typically has a monitor therein. The lid is pivotable between a closed position in which the lid overlies the keyboard and an open position in which the keyboard is exposed and the display screen is generally perpendicular to the base and faces the user.

While these laptop computers are extremely popular, they have at least one drawback that is becoming more problematic as the computers become more versatile. This problem is associated with ergonomics. That is, if the computer is located in a position that causes the user to bend over or to adopt an uncomfortable posture to see the monitor, then long use of the computer may become uncomfortable. This may result in fatigue, strain and backaches.

Therefore, there is a need for a computer that will permit the user to be in the most comfortable position during use.

Still further, many laptop computers are used in unusual lighting situations. This can create a problem seeing the monitor screen. The user may be forced to orient the computer in an odd orientation to see the monitor screen. This exacerbates the above-discussed problem of fatigue, strain and the like. It may even make it nearly impossible to use the computer as designed.

Therefore, there is a need for a computer that will permit a user to orient the monitor screen in the most advantageous orientation without requiring the user to adopt a difficult and/or uncomfortable position during use of the computer.

Furthermore, while it may be convenient to support a laptop computer on a particular surface, that support surface may not permit the monitor screen to be located at a height that is most advantageous for the user. The user then must choose between a convenient supporting position for the computer and a convenient height for the monitor screen. The user may then have to bend over to see the screen or otherwise adopt an uncomfortable or inconvenient position to use the computer.

Therefore, there is a need for a computer that will permit a user to position the monitor screen at a convenient height during use of the computer without unduly sacrificing convenience of location for the computer support.

While the art has many examples of monitors that are tiltably adjustable, as can be understood from the foregoing, angular or tiltable adjustment alone does not completely fill the need for an ergonomic computer. Due to the location of the computer, angular adjustment alone may only compensate for glare and sight lines. Moving the monitor into a location that is more convenient and comfortable in addition to angular adjustment is usually required to fully realize the advantages of laptop or notebook type computers.

Therefore, there is a need for a computer which has a monitor screen with multiple degrees of freedom with respect to the base of the computer.

PRINCIPAL OBJECTS OF THE INVENTION

It is a main object of the present invention to provide a computer that will permit the user to be in the most comfortable position during use.

It is another object of the present invention to provide a computer that will permit a user to orient the monitor screen in the most advantageous orientation without requiring the user to adopt a difficult and/or uncomfortable position during use of the computer.

It is another object of the present invention to provide a computer that will permit a user to have the monitor screen at a convenient height during use of the computer without unduly sacrificing convenience of location for the computer support.

It is another object of the present invention to provide a computer which has a monitor screen with multiple degrees of freedom with respect to the base of the computer.

SUMMARY OF THE INVENTION

These, and other, objects are achieved by an accessory for a computer which includes a base in which appropriate electronics, as well as the keyboard are located, a monitor electronically connected to the appropriate electronics in the base, two stanchions pivotally mounted on the base to move between a position adjacent to the base and a position that is upright with respect to the base. The monitor is pivotally mounted on the stanchions to move with respect to the stanchions between a tilted orientation and an upright orientation. The monitor is also slidably mounted on the stanchions to move toward and away from the base between a first position adjacent to the base and a second position spaced from the base. The monitor is frictionally held on the stanchions to hold the tilted orientation when placed in the tilted orientation.

The monitor thus has multiple degrees of freedom with respect to the base and can be angularly as well as rectilinearly adjusted with respect to the base. The monitor can be tiltably adjusted after it has been adjusted for height. In this manner, the monitor can be placed in an orientation and position that are most advantageous to the user. The computer can thus be used without requiring the user to adopt any unusual posture or to make a choice between unusual, and perhaps uncomfortable, posture and convenient use of the computer.

BRIEF DESCRIPTION OF THE DRAWINGS

FIG. 1 is a perspective view of a computer embodying the present invention.

FIG. 2 is a side elevational view of a computer with a monitor screen in an upright orientation with respect to the base of the computer.

FIG. 3 is a side elevational view of a computer with the monitor screen in a closed orientation with respect to the base of the computer.

FIG. 6A is an outside view of the stanchion shown in FIG. 5A.

FIG. 6B is an outside view of the stanchion shown in FIG. 5B.

FIG. 7 is a side elevational view showing two of the various orientations that monitor of the present invention can adopt with respect to the stanchions.

FIG. 13A illustrates a second pivot lock used in the computer of the present invention in a locking orientation.

FIG. 13B illustrates the second pivot lock in an unlocking orientation.

FIG. 13C illustrates the second pivot lock in an unlocking orientation and a knob in a position in which the monitor is not locked by the second pivot lock.

FIG. 14 is an elevational view of the computer of the present invention with an anti-tip element thereon.

DETAILED DESCRIPTION OF THE INVENTION

Figure 4:
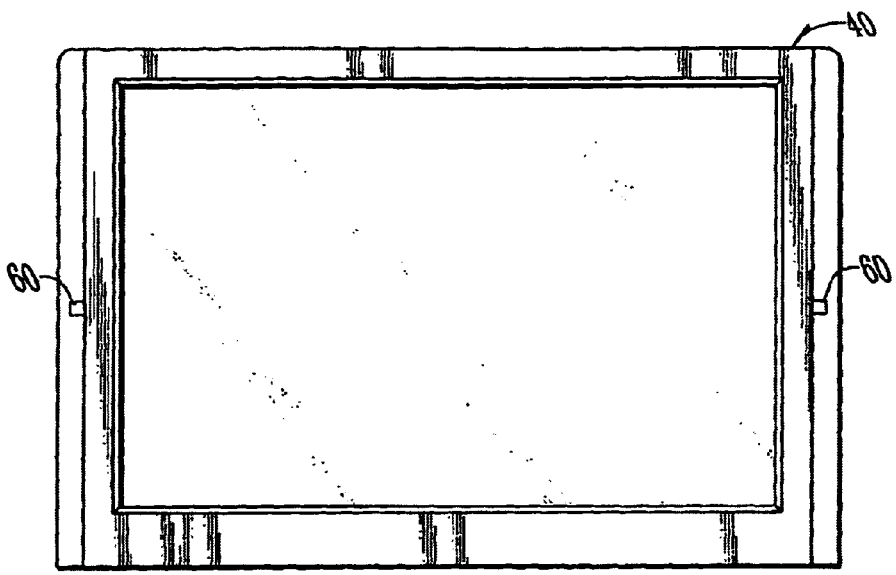
FIG. 4 is a front view of the system with the monitor in the closed condition.

Other objects, features and advantages of the invention will become apparent from a consideration of the following detailed description and the accompanying drawings.

The computer and the accessory therefor embodying the present invention permits the monitor thereof to be moved in a plurality of degrees of freedom with respect to the base of the computer so the monitor can be located and placed in a position and orientation that is most ergonomically advantageous for the user and does not force the user into choosing between proper use and proper support of the computer. The monitor can be adjusted to a proper height and then adjusted for a proper orientation angle.

Referring to the Figures, it can be understood that the present invention is embodied in a computer 10 and an accessory 12 therefore. Computer 10 and accessory 12 include a base 14 which includes first side 16 and second side 18, a front 20, a back 22, a top 24, a first corner 26 formed at an intersection of first side 16 and back 22 of base 14, a second corner 28 formed at an intersection of second side 18 and back 22 of base 14. A first hinge ear 30 is located on base 14 near first corner 26 of base 14, and a second hinge ear 32 is located on base 14 near second corner 28 of base 14.

A monitor 40 is mounted on base 14 and includes a first side 42 and second side 44, a top 46, a bottom 48, and a front 50. A longitudinal axis 52 extends between top 46 of monitor 40 and bottom 48 of monitor 40, and a transverse axis 54 extends between first side 42 and second side 44 of monitor 40. A first knob 60 is located on each of the first and second sides 42 and 44 of monitor 40, with only one of the first knobs 60 being shown in FIG. 1. First knobs 60 are each located between top 46 of monitor 40 and bottom 48 of monitor 40. In one form of the invention, the first knobs 60 are approximately one-half way between the top 46 and the bottom 48 of the monitor 40.

Figure 5A:
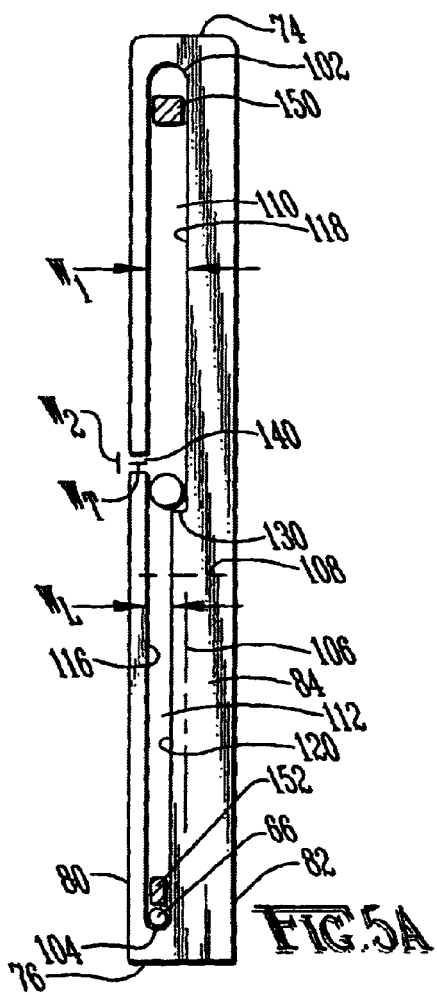
FIG. 5A is an inside view of a stanchion.
Figure 5B:
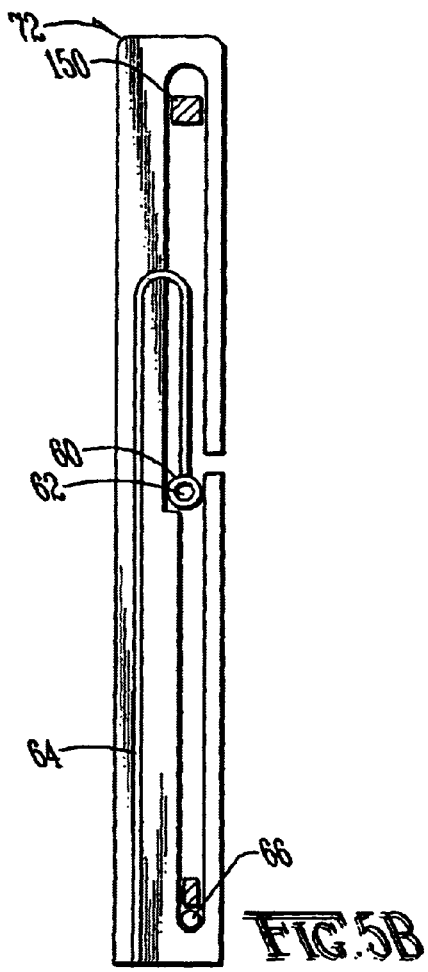
FIG. 5B is an inside view of another stanchion.

One first knob 60 has a bore defined therethrough, and such first knob 60 is shown in FIG. 5B having bore 62. An electrical connector 64 extends through bore 62 defined through the one first knob 60 and has one end thereof in electrical connection with electronic circuits and controls in monitor 40 and another end thereof in electrical connection with monitor electronic controls in base 14 and electrically connects monitor 40 to the monitor electronic controls in base 14. The monitor 40 further includes a second knob 66 on each of the first and second sides 42 and 44 of monitor 14, with only one of the second knobs 66 being visible in FIG. 1. Second knobs 66 are each located near bottom 48 of monitor 40.

Figure 8:
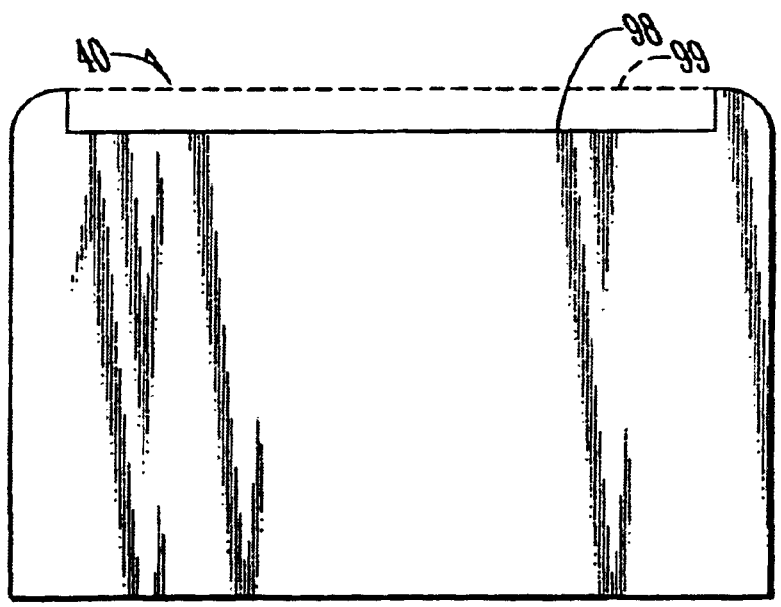
FIG. 8 is a rear view of a monitor of the computer of the present invention.
Figure 9:
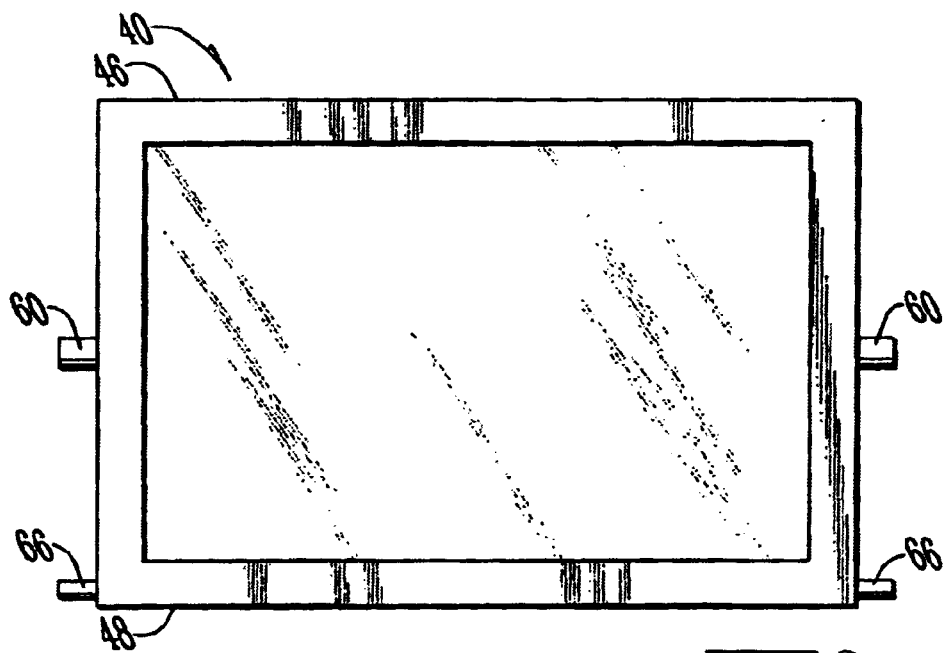
FIG. 9 is a view of the monitor showing the placement of the two knobs used to connect the monitor to the stanchions of the computer of the present invention.
Figure 11C:
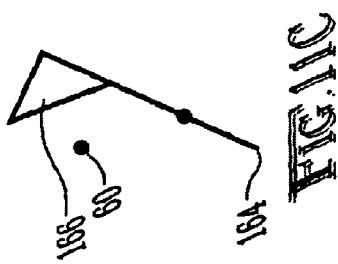
FIG. 11C illustrates the first pivot lock in an unlocking orientation and a knob in a position in which the monitor is not locked by the first pivot lock.
Figure 11B:
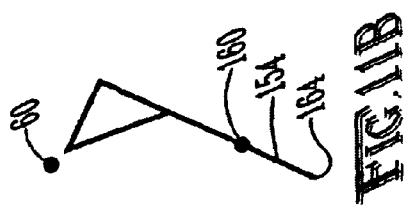
FIG. 11B illustrates the first pivot lock in an unlocking orientation.
Figure 12:
FIG. 12 is a view showing a spring for controlling movement of the pivot locks.
Figure 11A:
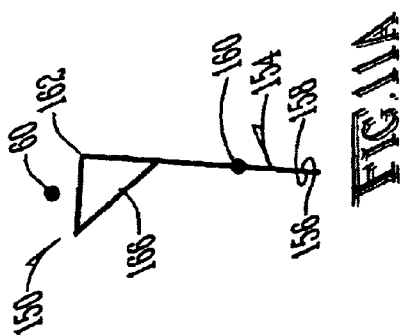
FIG. 11A illustrates a first pivot lock used in the computer of the present invention in a locking orientation.
Figure 10:
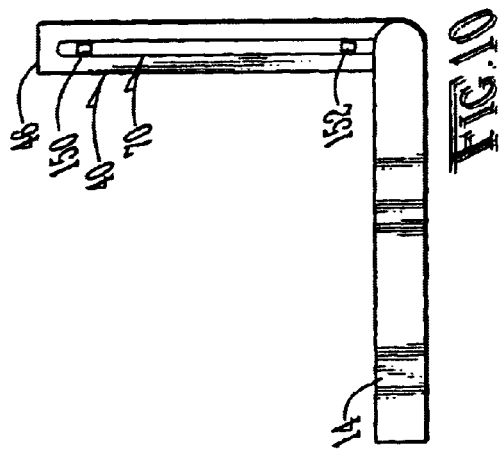
FIG. 10 is a side elevational view of the computer base and a stanchion with a compound groove defined therein.

The computer 10 and accessory 12 of the present invention further includes a first stanchion 70 and a second stanchion 72 mounted on the first and second hinge ears 30 and 32 of base 14 respectively. Stanchions 70 and 72 are shown in FIGS. 1, 5A–6B and are identical, Therefore, only stanchion 70 shown in FIGS. 1, 5A and 6A will be described, it being understood that the description applies to stanchion 72 as well. Thus, each of the first and second stanchions 70 and 72 includes a first end 74, a second end 76, a pivot pin 78 pivotally connects second end 76 of each stanchion to an associated one of first and second hinge ears 30 and 32. First and second stanchions 70 and 72 are pivotal between a first orientation shown in FIG. 3 adjacent to top 24 of base 14 and a second orientation shown in FIG. 2 which is upright with respect to base 14 and in which the stanchions extend away from base 14. The stanchions 70 and 72 further include a first side 80, a second side 82, an inside surface 84, and an outside surface 86. Outside surface 86 of each stanchion is located to be adjacent to second end 76 of each stanchion and is in sliding contact with a hinge ear, such as hinge ear 32. Each stanchion further has a longitudinal axis 90 extending between first end 74 and second end 76, and a transverse axis 92 extending between first side 80 and second side 82 of each stanchion. As can be understood from the front view shown in FIG. 4, the two stanchions are incorporated into the monitor 40. The monitor 40 includes a notch 98, as shown in FIG. 8, along the top to allow unimpeded pivoting when the monitor 40 is in an "up" position. If the notch 98 were not present, the monitor 40 may be blocked during some pivoting movement. Dotted line 99 represents the top of the monitor when the monitor 40 is in the "down" position.

Each stanchion further includes a compound groove 100 defined in inside surface 84 of each stanchion. The compound grooves 100 are identical and each includes a top 102 near first end 74 of each stanchion, a bottom 104 near second end 76 of each stanchion, a longitudinal axis 106 extending from top 102 of each groove 100 to bottom 104 of each groove 100, and a transverse axis 108 extending along transverse axis 92 of the stanchion in which the compound groove 100 is defined. Each compound groove 100 further includes a first section 110 extending from top 102 of compound groove 100 along longitudinal axis 106 of compound groove 100, and a second section 112 extending from bottom 104 of compound groove 100 along longitudinal axis 106 of compound groove 100. Each compound groove 100 further includes a first side edge 116 extending along longitudinal axis 106 of compound groove 100 from top 102 of compound groove 100 to bottom 104 of compound groove 100, a second side edge 118 extending from top 102 of compound groove 100 along longitudinal axis 106 of compound groove 100 and which is spaced apart from first side edge 116 of said compound groove, and a third side edge 120 extending from bottom 104 of compound groove 100 along longitudinal axis 106 of compound groove 100 and which is spaced apart from first side edge 116 of compound groove 100 along transverse axis 108 of compound groove 100.

First section 110 of each compound groove 100 has a width dimension $W_1$ defined along transverse axis 108 of compound groove 100 from first side edge 116 of compound groove 100 to second side edge 118 of compound groove 100. Second section 112 of each compound groove 100 has a width dimension $W_2$ which is defined along transverse axis 108 of compound groove 100 from first side edge 116 of compound groove 100 to third side edge 120 of compound groove 100. As can be seen in FIG. 5A, width dimension $W_1$ of first section 110 of compound groove 100 is greater than width dimension $W_2$ of the second section of said compound groove, i.e., $W_1 > W_2$. Each compound groove 100 further includes a shoulder 130 which extends along the transverse direction of compound groove 100 and which connects second side edge 118 of compound groove 100 to third side edge 120 of compound groove 100.

A transverse slot 140 is defined along transverse axis 92 of each of the stanchions and has one end 142 thereof which intersects first side 80 of the associated stanchion and a second end 144 thereof intersecting first side edge 116 of compound groove 100 in first section 110 of compound groove 100. Transverse slot 140 of compound groove 100 has a width dimension $W_T$ that extends along longitudinal axis 106 of compound groove 100, with width dimension $W_T$ of transverse slot 140 of compound groove 100 being essentially equal to width dimension $W_2$ of second section 112 of compound groove 100.

The computer 10 and accessory 12 of the present invention further includes a first pivot lock 150 and second pivot lock 152 on each stanchion. As shown in FIGS. 1, 5A–6B, 11A–13C, first pivot lock 150 is located near first end 74 of each stanchion and includes a body 154, an outside surface 156 located adjacent to outside surface 86 of each stanchion, an inside surface 158 located adjacent to compound groove 100 on each stanchion, a pivot pin 160 extending along transverse axis 92 of each stanchion and pivotally connecting body 154 of first pivot pin 150 to each stanchion, a first end 162, and a second end 164. Body 154 of first pivot lock 150 pivotally moves on pivot pin 160 of first pivot lock 150 between a locking orientation shown in FIG. 11A with the first end 162 of body 154 of first pivot lock 150 located in first section 110 of compound groove 100 and an unlocking orientation shown in FIG. 11C with first end 162 of body 154 of first pivot lock 150 located outside of compound groove 100. Pivot lock 150 further includes an interference element 166 on first end 162 of body 154 of first pivot lock 150. Interference element 166 of first pivot lock 150 is located to engage first knob 60 when body 154 of first pivot lock 150 is in the locking orientation.

Second pivot lock 152 is located near second end 76 of each stanchion and includes a body 170, an outside surface 172 located adjacent to outside surface 86 of each stanchion, an inside surface 174 located adjacent to compound groove 100 on each stanchion, a pivot pin 176 extending along transverse axis 92 of each stanchion and pivotally connecting body 170 of second pivot lock 152 to each stanchion, a first end 180, and a second end 182. Body 170 of second pivot lock 152 pivotally moves on pivot pin 176 of second pivot lock 152 between a locking orientation shown in FIG. 13A with second end 182 of body 170 of second pivot lock 152 located in second section 112 of compound groove 100 and an unlocking orientation shown in FIG. 13C with second end 182 of body 170 of second pivot lock 152 located outside of compound groove 100. Second pivot lock 152 further includes an interference element 190 on second end 182 of body 170 of second pivot lock 152. Interference element 190 of second pivot lock 152 is located to engage second knob 66 when body 170 of second pivot lock 152 is in the locking orientation shown in FIG. 13A.

First knob 60 is sized to be frictionally held in first section 110 of compound groove 100 whereby monitor 40 can be tilted with respect to the stanchions as shown in FIG. 7 and will be held in a tilted orientation by the frictional engagement between first knob 60 and the first and second side edges of compound groove 100. Second knob 66 is sized to slide through transverse slot 140 defined in each stanchion whereby bottom 48 of monitor 40 can be moved away from the stanchions after second knob 66 has been slid through transverse slot 140 defined in each stanchion. This movement can be understood by comparing FIGS. 1 and 2 and permits monitor 40 to have both angular movement with respect to base 14 after the second knobs 66 on monitor 40 have moved through the transverse slots of the compound grooves on first and second stanchions 70 and 72 and out of the one ends 142 of transverse slots 140 of the compound grooves and linear movement with respect to base 14 toward and away from base 14 with the first knobs 60 on monitor 40 slidably moving along the longitudinal axes of first and second stanchions 70 and 72 in the first sections 110 of the compound grooves on the first and second stanchions.

One form of the computer 10 and accessory 12 of the present invention includes an anti-tip element 240 shown in FIG. 15 to add stability to the computer 10 when the monitor 40 is in the up and tilted orientation shown in FIG. 15. The anti-tip element 240 is a slidable plate that can be moved into the base 14 when not in use, and then simply pulled out into the FIG. 14 configuration when necessary as indicated by double-headed arrow 242.

It is to be understood that while certain forms of the present invention have been illustrated and described herein, it is not to be limited to the specific forms or arrangements of parts described and shown.

We claim:

1. An accessory for a computer comprising:
   a) a base which includes
      (1) first and second sides,
      (2) a front,
      (3) a back,
      (4) a top,
      (5) a first corner formed at an intersection of the first side and the back of said base,
      (6) a second corner formed at an intersection of the second side and the back of said base,
      (7) a first hinge ear on said base near the first corner of said base, and
      (8) a second hinge ear on said base near the second corner of said base;
   b) a monitor on said base which includes
      (1) first and second sides,
      (2) a top,
      (3) a bottom,
      (4) a front, (5) a longitudinal axis extending between the top of the monitor and the bottom of said monitor,
(6) a transverse axis extending between the first and second sides of said monitor,
(7) a first knob on each of the first and second sides of said monitor, the first knobs each being located between the top of said monitor and the bottom of said monitor,
(8) one first knob having a bore defined therethrough,
(9) an electrical connector extending through the bore defined through the one first knob and having one end thereof in electrical connection with said monitor and another end thereof in electrical connection with monitor electronic controls in said base and electrically connecting said monitor to the monitor electronic controls in said base, and
(10) a second knob on each of the first and second sides of said monitor, the second knobs each being located near the bottom of said monitor;
c) first and second stanchions mounted on the first and second hinge ears of said base respectively, each of said first and second stanchions including
(1) a first end,
(2) a second end,
(3) a pivot pin pivotally connecting the second end of each stanchion to an associated one of said first and second hinge ears,
(4) the first and second stanchions being pivotal between a first orientation adjacent to the top of said base and a second orientation which is upright with respect to said base and extending away from said base,
(5) a first side,
(6) a second side,
(7) an inside surface,
(8) an outside surface, the outside surface of each stanchion adjacent to the second end of each stanchion being in sliding contact with a hinge ear,
(9) a longitudinal axis extending between the first and second ends of each stanchion, and
(10) a transverse axis extending between the first and second sides of each stanchion;
d) a compound groove defined in the inside surface of each stanchion, each compound groove including
(1) a top near the first end of each stanchion,
(2) a bottom near the second end of each stanchion,
(3) a longitudinal axis extending from the top of each groove to the bottom of each groove,
(4) a transverse axis extending along the transverse axis of the stanchion in which the compound groove is defined,
(5) a first section extending from the top of said compound groove along the longitudinal axis of said compound groove,
(6) a second section extending from the bottom of said compound groove along the longitudinal axis of said compound groove,
(7) a first side edge extending along the longitudinal axis of said compound groove from the top of said compound groove to the bottom of said compound groove,
(8) a second side edge extending from the top of said compound groove along the longitudinal axis of said compound groove and being spaced apart from the first side edge of said compound groove,
(9) a third side edge extending from the bottom of said compound groove along the longitudinal axis of said compound groove and spaced apart from the first side edge of said compound groove along the transverse axis of said compound groove,
(10) the first section of each compound groove having a width dimension defined along the transverse axis of the compound groove from the first side of said compound groove to the second side edge of said compound groove,
(11) the second section of each compound groove having a width dimension defined along the transverse axis of the compound groove from the first side of said compound groove to the third side edge of said compound groove,
(12) the width dimension of the first section of said compound groove being greater than the width dimension of the second section of said compound groove,
(13) a shoulder extending along the transverse direction of said compound groove and connecting the second side edge of said compound groove to the third side edge of said compound groove,
(14) a transverse slot defined along the transverse axis of said stanchion and having one end thereof intersecting the first side of said stanchion and a second end thereof intersecting the first side edge of said compound groove in the first section of said compound groove,
(15) the transverse slot of said compound groove having a width dimension that extends along the longitudinal axis of said compound groove,
(16) the width dimension of the transverse slot of said compound groove being essentially equal to the width dimension of the second section of said compound groove, and
(17) the electrical connector of said monitor being located in said compound groove;
e) first and second pivot locks on each stanchion,
(1) said first pivot lock being located near the first end of each stanchion and including
(A) a body,
(B) an outside surface located adjacent to the outside surface of each stanchion,
(C) an inside surface located adjacent to said compound groove on each stanchion,
(D) a pivot pin extending along the transverse axis of each stanchion and pivotally connecting the body of said first pivot lock to each stanchion,
(E) a first end,
(F) a second end,
(G) the body of said first pivot lock pivotally moving on the pivot pin of said first pivot lock between a locking orientation with the first end of the body of said first pivot lock located in the first section of said compound groove and an unlocking orientation with the first end of the body of said first pivot lock located outside of said compound groove,
(H) an interference element on the first end of the body of said first pivot lock, and
(I) the interference element of said first pivot lock being located to engage said first knob when the body of said first pivot lock is in the locking orientation, and
(2) said second pivot lock being located near the second end of each stanchion and including
(A) a body,
(B) an outside surface located adjacent to the outside surface of each stanchion, (C) an inside surface located adjacent to said compound groove on each stanchion,
(D) a pivot pin extending along the transverse axis of each stanchion and pivotally connecting the body of said second pivot lock to each stanchion,
(E) a first end,
(F) a second end,
(G) the body of said second pivot lock pivotally moving on the pivot pin of said second pivot lock between a locking orientation with the second end of the body of said second pivot lock located in the second section of said compound groove and an unlocking orientation with the second end of the body of said second pivot lock located outside of said compound groove,
(H) an interference element on the second end of the body of said second pivot lock, and
(I) the interference element of said second pivot lock being located to engage said second knob when the body of said second pivot lock is in the locking orientation;

f) the first knob being sized to be frictionally held in the first section of said compound groove whereby said monitor can be tilted with respect to said stanchions and will be held in a tilted orientation by the frictional engagement between said first knob and the first and second side edges of said compound groove;

g) the second knob being sized to slide through the transverse slot defined in each stanchion whereby the bottom of said monitor can be moved away from said stanchions after said second knob has been slid through the transverse slot defined in each stanchion; and h) said monitor having both angular movement with respect to said base after the second knobs on said monitor have moved through the transverse slots of said compound curves on said first and second stanchions and out of the one ends of the transverse slots of said compound grooves and linear movement with respect to said base toward and away from said base with said first knobs on said monitor slidably moving along the longitudinal axes of said first and second stanchions in the first sections of said compound curves on said first and second stanchions.

2. The accessory as described in claim 1 further including an anti-tilt element mounted on said base near the back of said base.

3. The accessory as described in claim 2 further including a bottom of said base, with said anti-tip element being slidably connected to the bottom of said base and being movable between a stored condition in said base and a deployed condition extending from the back of said base.

* * * * *